Patented Mar. 6, 1923.

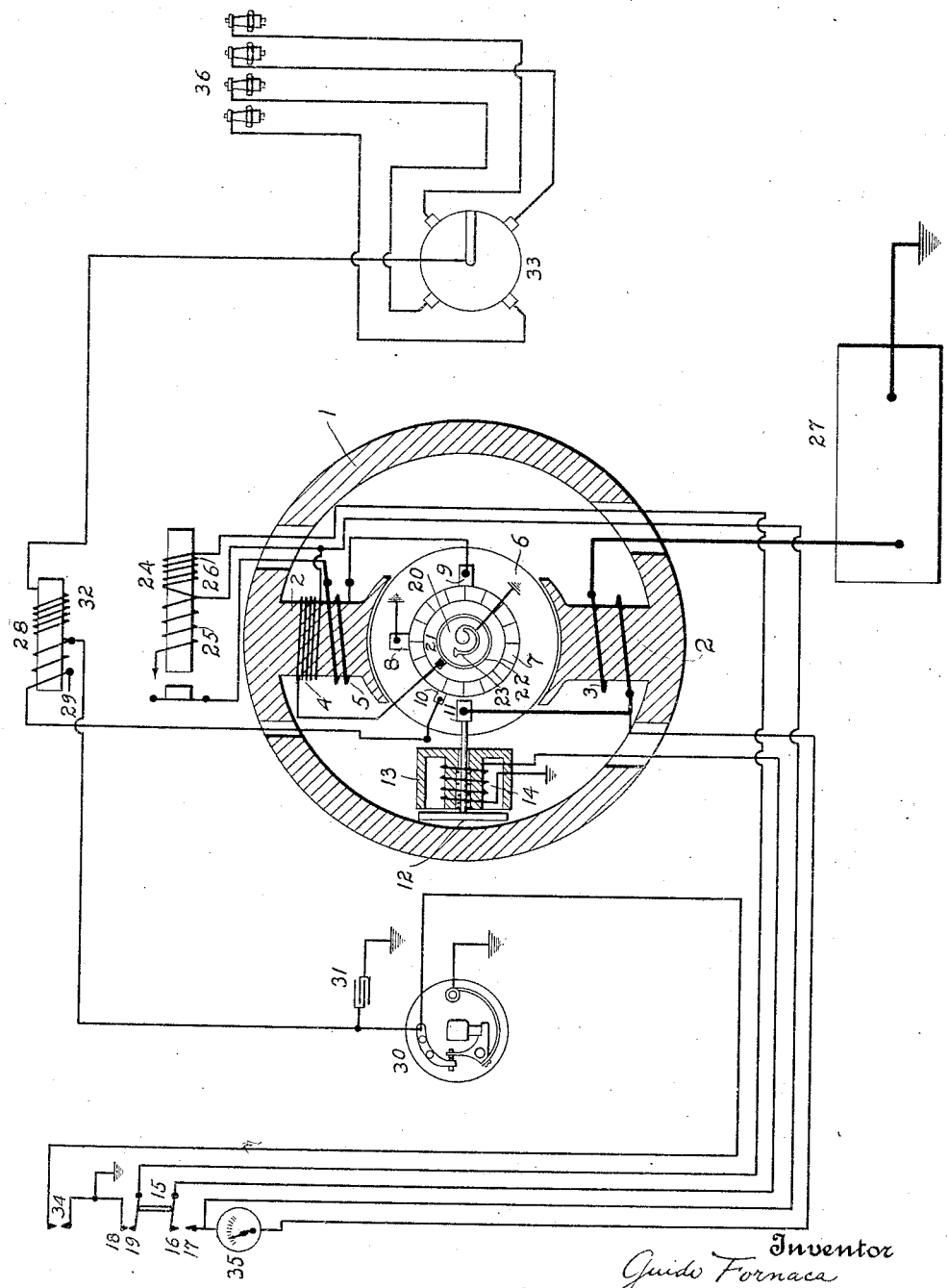

1,447,241

UNITED STATES PATENT OFFICE.

GUIDO FORNACA, OF TURIN, ITALY.

ELECTRICAL SYSTEM FOR AUTOMOBILES.

Application filed January 12, 1920. Serial No. 351,065.

*To all whom it may concern:*

Be it known that I, GUIDO FORNACA, a subject of the King of Italy, residing at Turin, in the Province of Piedmont and State of Italy, have invented certain new and useful Improvements in Electrical Systems for Automobiles, of which the following is a specification.

This invention relates to the electrical apparatus of automobiles driven by internal combustion engines. The object of the invention is to provide apparatus combining in a single system having a single dynamo, the functions of starting the engine, charging the battery and furnishing current for ignition and lights and various accessories.

In the accompanying drawing a system and apparatus embodying this invention is shown diagrammatically in connection with an installation for an automobile.

In the apparatus shown a single dynamo serves as a dynamo electric machine and comprises a body portion 1 with one or more poles 2 on which are wound three types of windings. One winding 3 in series with the armature serves as a motor field; a second winding 4 in parallel with the brushes serves as a generator field and a third winding 5 in series with an outside circuit serves for the regulation of the voltage of the apparatus when functioning as a generator and as a magneto. An armature 6 uniting the three functions of the apparatus is provided with a single commutator 7. On the commutator 7 rest four brushes collecting the current. The brush 8 which is grounded serves for all the functions of the machine; the brush 9 serves to collect the current of the generator; the brush 10 to collect the current for the ignition system and the brush 11 is only in operation when the machine is operating as a motor. This last brush is movable to and from contact with the commutator by means of the disk 12 and electro magnet 13 so that when current passes through the winding 14 of the electro magnet, the brush 11 is pressed into contact with the commutator 7, as when the switch 15 is turned to close contact 16, 17 and open contacts 18, 19.

At the center of the commutator 7, there is provided a centrifugally operated switch 20 connected to the winding 4 by the brush 21 contacting with the collector ring 22, which in turn is connected to the ground through the centrifugal switch 20, the end 23 of which when the motor exceeds a certain speed is connected to this collector ring, the other side of the switch being grounded as shown. The electro-magnet shown at 24 and its windings 25, in series with generator load, and 26, in parallel with the brushes 8 and 9, serve to connect the generator to its load including the battery 27 when the generator voltage exceeds a certain predetermined amount and disconnect it from the load when the generator voltage drops below this value, and also serve to regulate the generator voltage.

The transformer 28 has a primary winding 29 connected to the interrupter or timer 30 driven by the automobile engine, and in this primary circuit there is included the grounded condenser 31 as shown. The high tension current of the secondary winding 32 is distributed with the spark plugs 36 of the automobile engine by the distributer 33.

The switch 34 serves to ground the primary of the transformer 28 so as to stop the engine.

In the operation of this system with the automobile engine standing still there is no current in any circuit of the apparatus, since the dynamo does not produce any energy and the battery is disconnected by the automatic switch 24 and the centrifugal switch 20 and the brush 11 are also at a position of open circuit. Upon movement of the switch 15 to make contact at 16, 17, a circuit is completed through the winding 14 of the electro-magnet 13, bringing the brush 11 into contact with the commutator 7 and placing the motor generator in circuit with the battery. Under these conditions the apparatus operates as a starting motor.

A portion of the battery current collected by the brush 10 is transferred to the primary winding 29 of the transformer 28 and under the action of the interrupter 30 induces current of high tension in the secondary 32. This current is conducted by means of the distributer 33 to the spark plugs 36 where they ignite the mixture and start the automobile engine. As soon as the motor is started the switch 15 returns to its upper position where contacts 18 and 19 are closed and contacts 16 and 17 are separated; as a result the electro magnet 13 ceases to function and the brush 11 is drawn away from the commutator 7. At this instant the apparatus stops operating as a motor.

As soon as the automobile engine is set in motion the centrifugal interrupter closes the circuit between the batteries and the winding 4 on the poles 2 of the machine. Therefore this remains excited and produces current at the commutator. One part of this current is collected by the brush 10 and passed on to the transformer 28, distributer 33 and spark plugs 36. Under these conditions the apparatus operates as a ignition magneto.

As soon as the velocity of the dynamo is sufficient to generate a voltage equal or greater than that of the battery 27, the electro-magnet 24 forming the minimum interrupter connects the generator in series with the battery through the switch 15 at contacts 18 and 19 through brushes 8 and 9 and battery 27, the field winding 4 being also in circuit. The generator thus serves to charge the battery or maintain it charged and supply the current for lighting and other accessories of the automobile. This current of the machine under load passes through the field winding 5, thus strengthening the field according to the demands of the load and keeping up or increasing the voltage delivered by the machine with increasing load, and decreasing the field strength and voltage with decreasing load, thus tending to supply current in accordance with the demands made upon the dynamo. Under these conditions the machine operates as a generator and magneto.

Upon movement of switch 15 separating the two contacts 18 and 19 the circuit through the winding 26 is broken preventing the automatic switch 24 from working and when the circuit at 16, 17 is closed the circuit from the battery to the starting motor is completed.

In the apparatus of this invention all the functions of starting generation and ignition are combined in a single machine instead of having a different separate device for each purpose. The dynamo of this invention does not have to operate in any specific timed relation to the engine crank shaft and may therefore be connected in most convenient and advantageous manner to any rotatable part and without special intermediate gearing.

I claim:—

1. In an electrical system for an automobile, the combination of an engine, a battery, and a dynamo, said dynamo having a single commutator, a brush normally out of contact with said commutator, electro magnetic means for causing said brush to engage said commutator and to connect a series field winding of said dynamo in series with the armature of the dynamo and with said battery to cause the dynamo to operate as a motor to start said engine, a second brush engaging said commutator, an automatic switch for connecting said second brush and a series field winding of said dynamo in circuit with said battery upon the dynamo generating a predetermined voltage, and a third brush engaging said commutator and connected in circuit with said battery and said two brushes during both the starting and generating operations.

2. In an electrical system for an automobile, the combination of an engine, a battery, and a dynamo, said dynamo having a single commutator, a brush normally out of contact with said commutator, electro magnetic means for causing said brush to engage said commutator and to connect a series field winding of said dynamo in series with the armature of the dynamo and with said battery to cause the dynamo to operate as a motor to start said engine, a second brush engaging said commutator, an automatic switch for connecting said second brush and a series field winding of said dynamo in circuit with said battery upon the dynamo generating a predetermined voltage, a third brush engaging said commutator and connected in circuit with said battery and said two brushes during both the starting and generating operations, and means comprising a fourth brush engaging said commutator for supplying ignition energy to said engine during starting and running conditions.

3. In an electrical system for an automobile, the combination of an engine, a battery, and a dynamo, said dynamo having a single commutator, a brush normally out of contact with said commutator, electro magnetic means for causing said brush to engage said commutator and to connect a series field winding of said dynamo in series with the armature of the dynamo and with said battery to cause the dynamo to operate as a motor to start said engine, a second brush engaging said commutator, an automatic switch for connecting said second brush and a series field winding of said dynamo in circuit with said battery upon the dynamo generating a predetermined voltage, a third brush engaging said commutator and connected in circuit with said battery and said two brushes during both the starting and generating operations, a shunt field winding for said dynamo, and automatic means for connecting said shunt winding in circuit when the dynamo is driven as a generator.

ING. GUIDO FORNACA.